(12) United States Patent
Robert et al.

(10) Patent No.: US 8,819,571 B2
(45) Date of Patent: Aug. 26, 2014

(54) MANIPULATING PREVIEW PANELS IN A USER INTERFACE

(75) Inventors: Julien Robert, Paris (FR); Julien Jalon, Paris (FR)

(73) Assignee: Apple Inc., Cupertino, CA (US)

( * ) Notice: Subject to any disclaimer, the term of this patent is extended or adjusted under 35 U.S.C. 154(b) by 620 days.

(21) Appl. No.: 12/895,669

(22) Filed: Sep. 30, 2010

(65) Prior Publication Data

US 2012/0084688 A1    Apr. 5, 2012

(51) Int. Cl.
*G06F 3/048* (2013.01)
(52) U.S. Cl.
USPC .......................................................... 715/769
(58) Field of Classification Search
USPC .......................................... 715/769, 784, 788
See application file for complete search history.

(56) References Cited

U.S. PATENT DOCUMENTS

| | | | | |
|---|---|---|---|---|
| 5,065,345 A * | 11/1991 | Knowles et al. | ............... | 715/202 |
| 5,140,678 A * | 8/1992 | Torres | ............................ | 715/777 |
| 5,619,639 A * | 4/1997 | Mast | ............................... | 715/798 |
| 5,754,798 A * | 5/1998 | Uehara et al. | .................. | 710/104 |
| 6,160,554 A * | 12/2000 | Krause | ............................ | 715/804 |
| 6,928,619 B2 * | 8/2005 | Clow et al. | ...................... | 715/767 |
| 7,100,123 B1 * | 8/2006 | Todd et al. | ....................... | 715/862 |
| 7,111,239 B2 * | 9/2006 | Morris-Yates | ................. | 715/709 |
| 7,296,230 B2 * | 11/2007 | Fukatsu et al. | ................. | 715/711 |
| 7,596,766 B1 * | 9/2009 | Sharma et al. | ................. | 715/854 |
| 7,665,028 B2 | 2/2010 | Cummins et al. | | |
| 7,877,319 B2 * | 1/2011 | Miles et al. | ...................... | 705/37 |
| 8,261,205 B2 * | 9/2012 | Lee | ................................ | 715/784 |
| 2003/0043206 A1 * | 3/2003 | Duarte | ........................... | 345/810 |
| 2004/0205633 A1 | 10/2004 | Martinez et al. | | |
| 2005/0114778 A1 * | 5/2005 | Branson et al. | ................ | 715/711 |
| 2005/0251784 A1 * | 11/2005 | Krebs | ............................. | 717/104 |
| 2009/0265632 A1 | 10/2009 | Russ et al. | | |
| 2009/0313586 A1 * | 12/2009 | Sharma et al. | ................. | 715/853 |
| 2010/0088642 A1 * | 4/2010 | Yeh et al. | ........................ | 715/835 |
| 2013/0215148 A1 * | 8/2013 | Antonyuk et al. | ............. | 345/633 |

FOREIGN PATENT DOCUMENTS

WO    WO 2008/041297 A1    4/2008

* cited by examiner

*Primary Examiner* — Phenuel Salomon
(74) *Attorney, Agent, or Firm* — Schwegman Lundberg & Woessner, P.A.

(57) ABSTRACT

Methods, machine media, and systems that can manipulate preview panels are disclosed. In one embodiment, a preview panel can be transformed, in response to user interaction with the preview panel, into an icon representing the file containing the content displayed in the preview panel. The preview panel can, in one embodiment, be opened from a user interaction with a first icon and the preview panel can be transformed into a second icon that represents the file and can be manipulated as if it were the first icon.

21 Claims, 16 Drawing Sheets

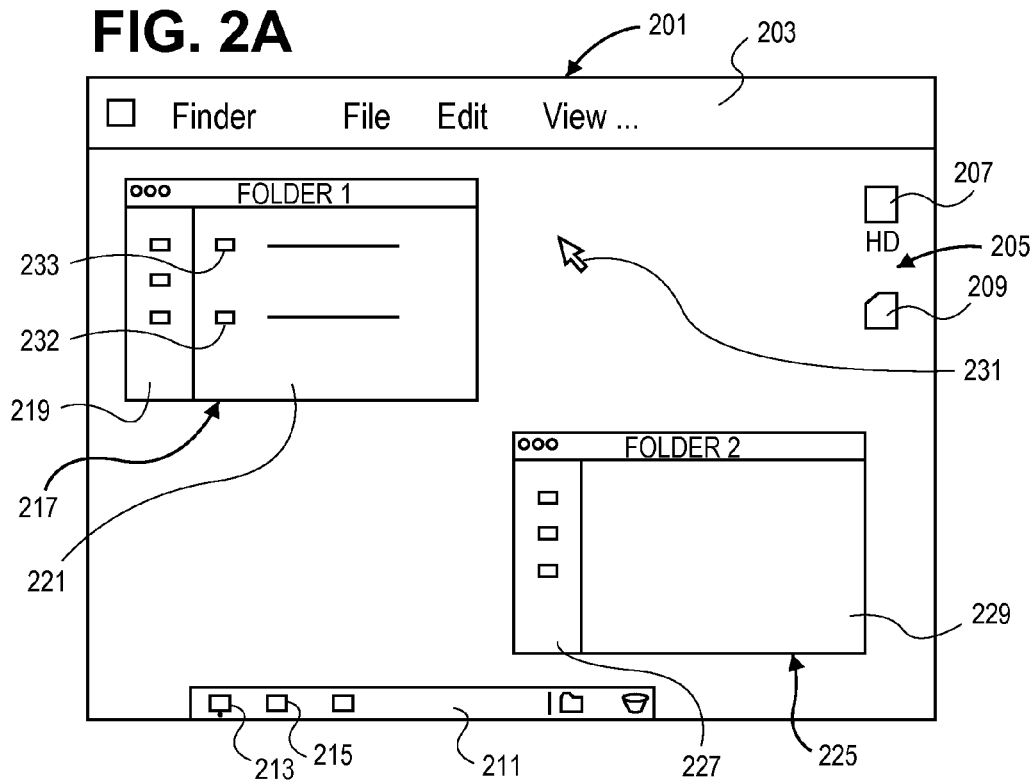
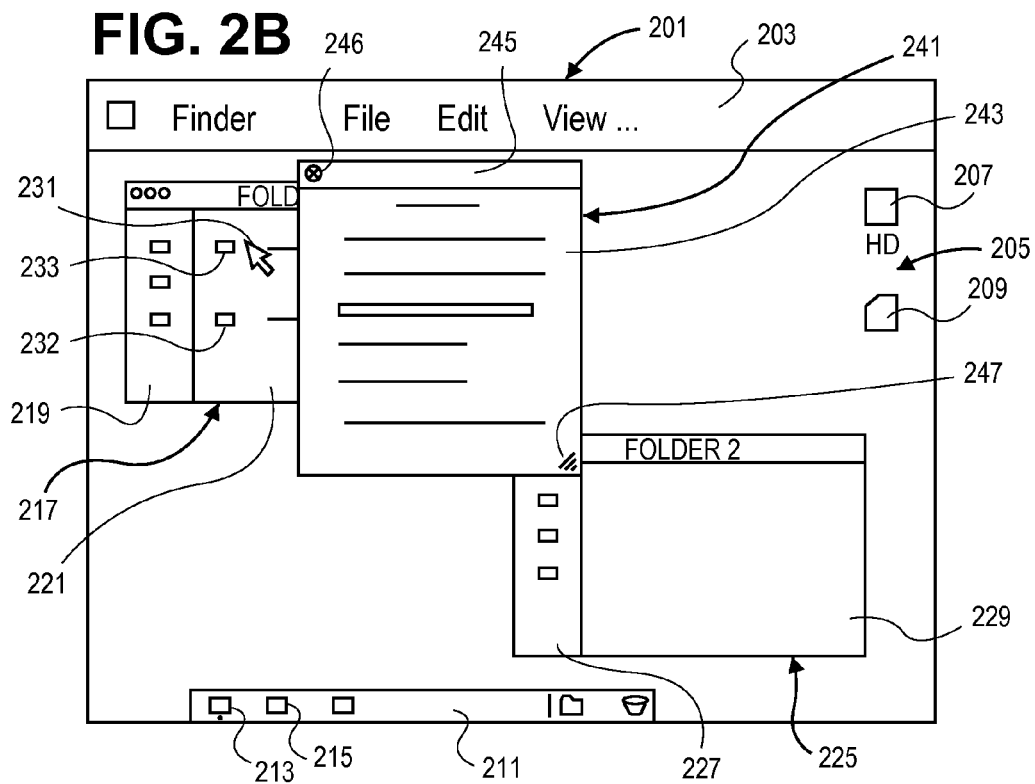

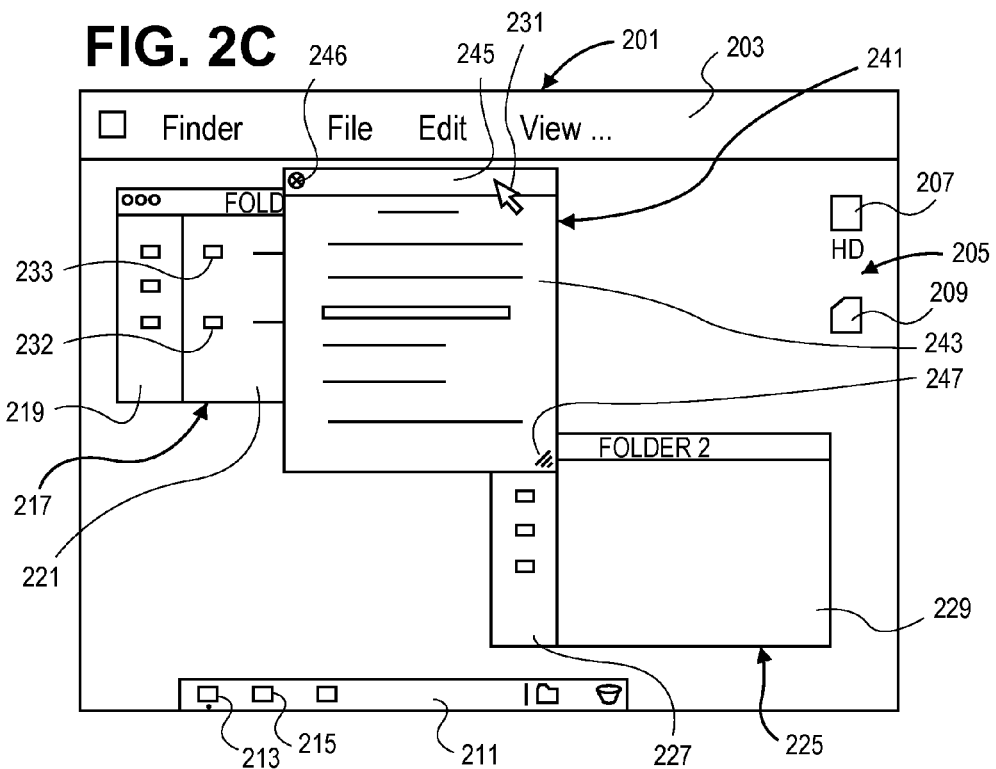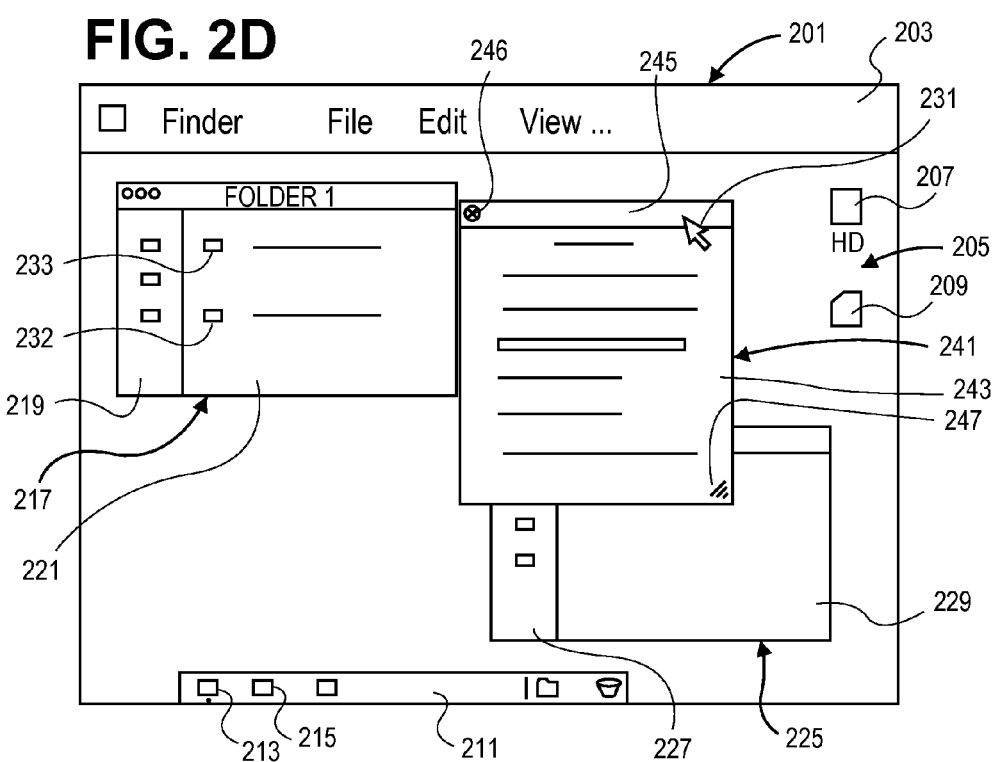

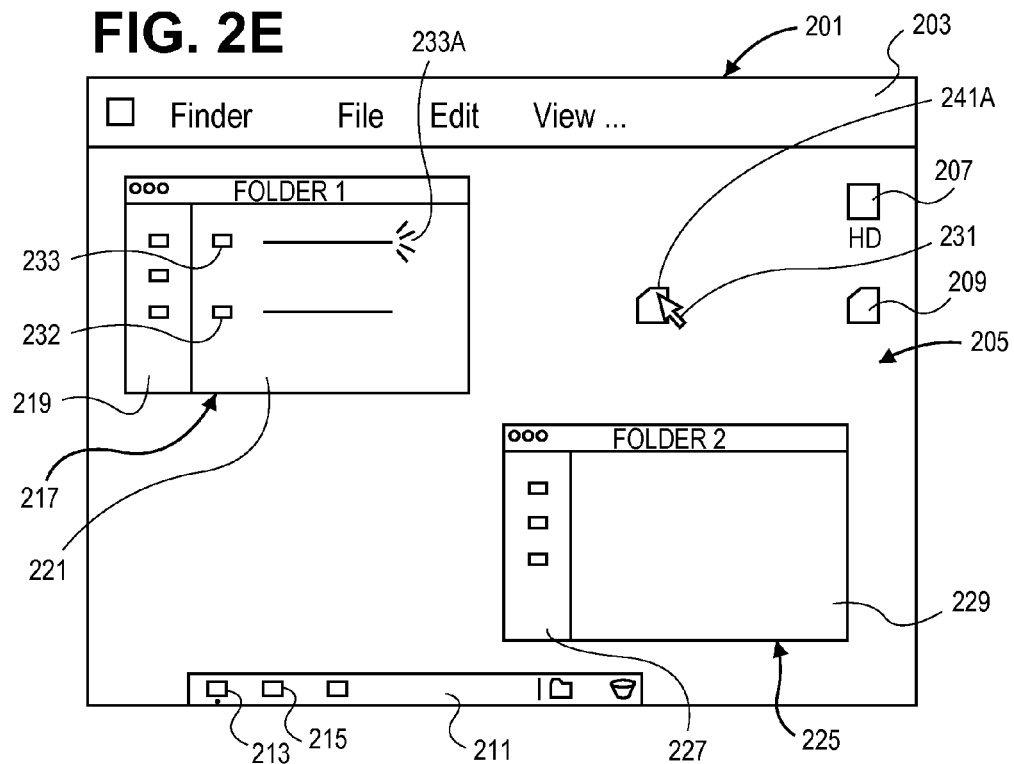
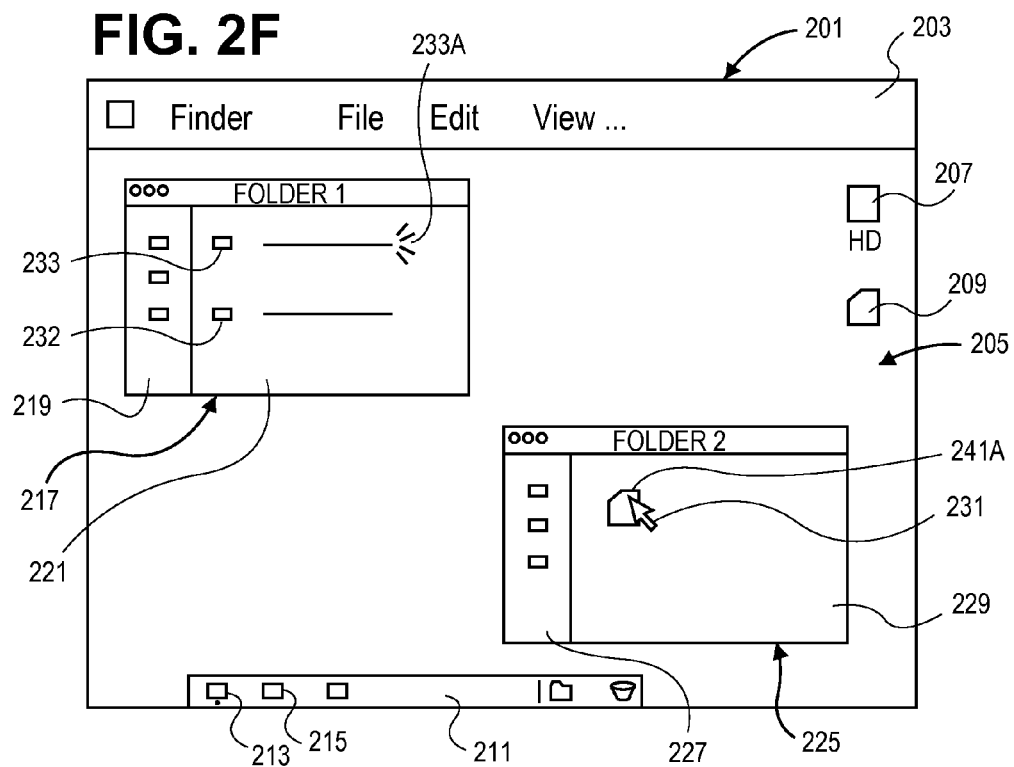

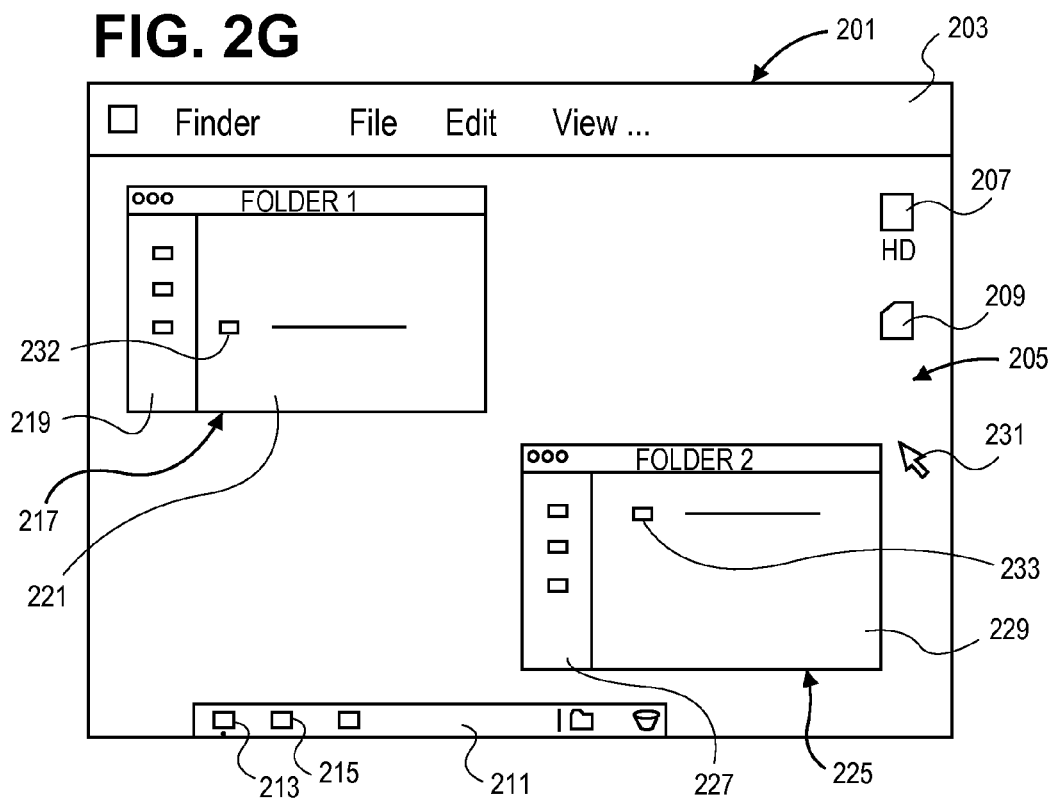

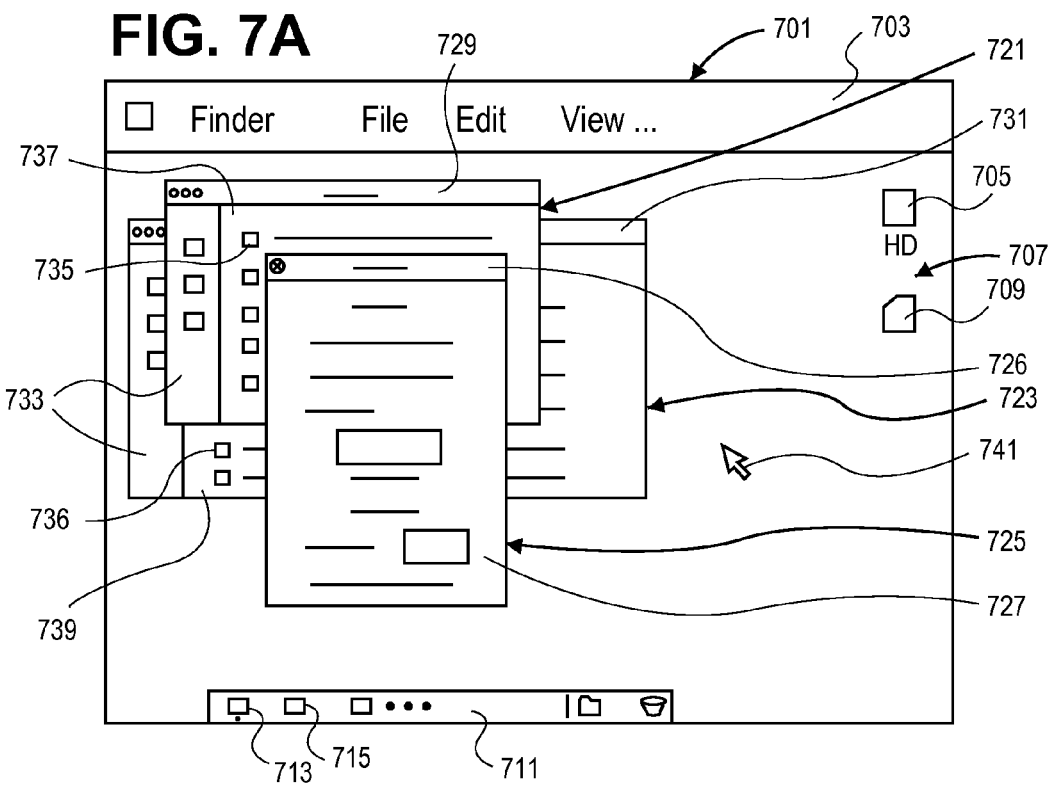
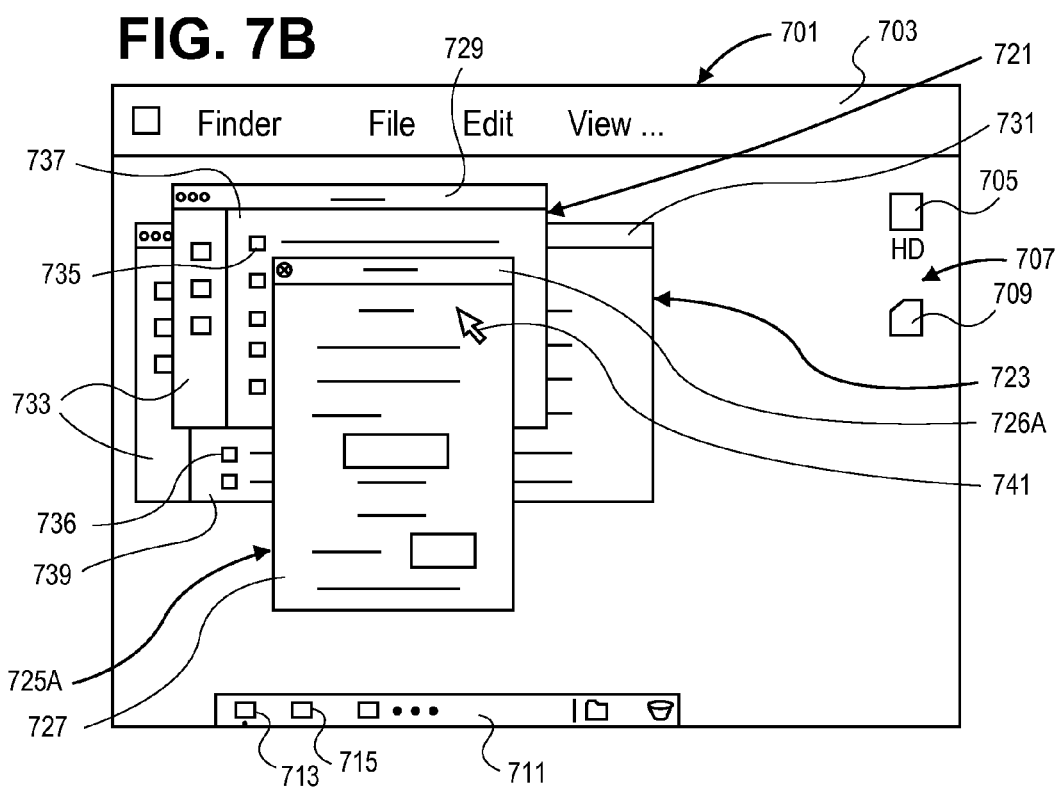

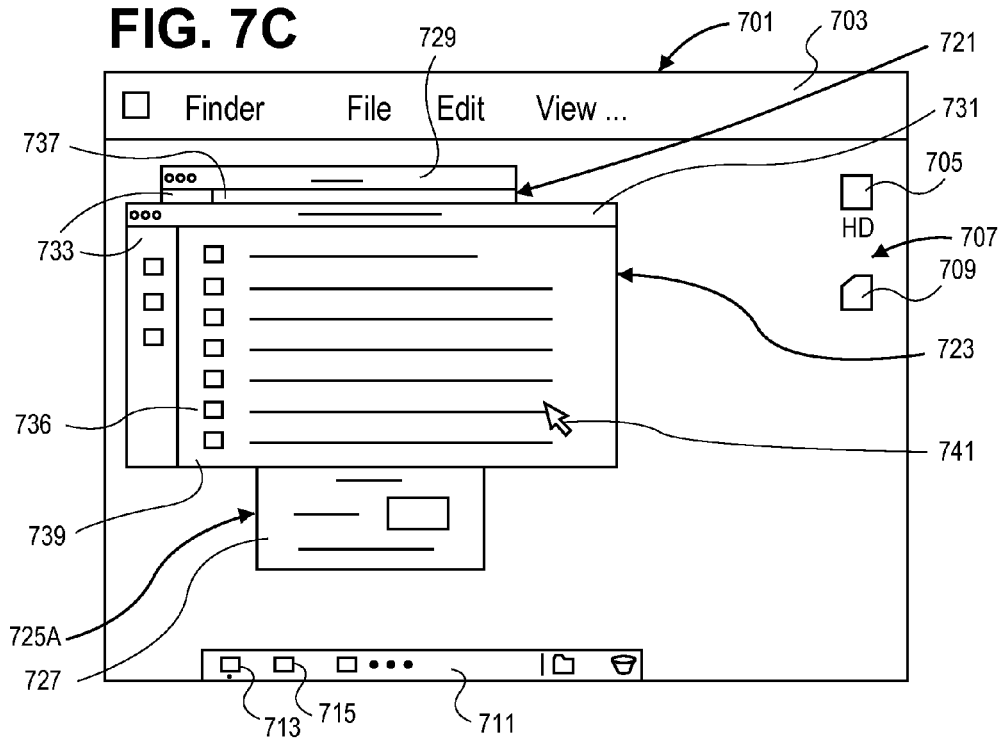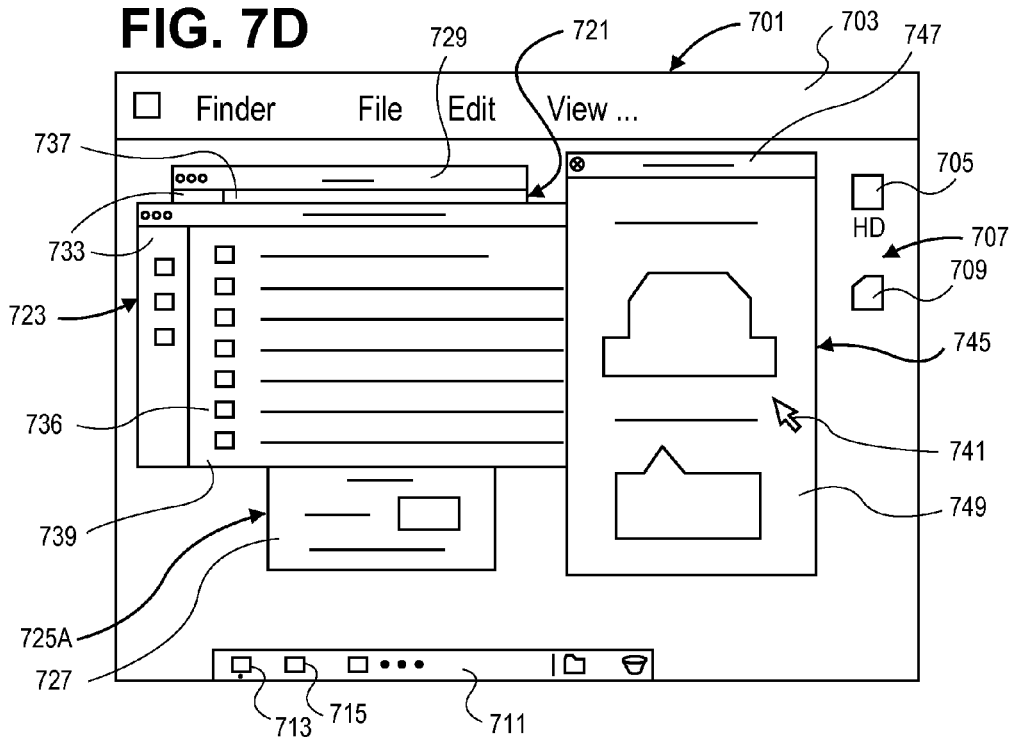

MANIPULATING PREVIEW PANELS IN A USER INTERFACE

BACKGROUND OF THE INVENTION

Modern data processing systems can provide a preview of a file, such as a word processing document or a spreadsheet or a PowerPoint presentation, or a PDF file, etc. without having to launch the application which created the file. The application which created the file can be considered or referred to as a native application. The preview can be generated by a non-native application which cannot edit or create the file, while the native application can edit or create the file. In prior art systems, the presentation of a preview occurs in a preview window or panel which allows a limited set of uses by the user. The user can present the preview panel and move the preview panel and close the preview panel, but is otherwise limited in the ability to interact with the preview panel.

Prior art systems also include the ability to allow the user to interact with files in a file management system, usually through a user interface program such as the Finder program which is provided on the Macintosh Operating System (Mac OS X) or other programs which are similar to the Finder such as Windows Explorer on Windows operating systems from Microsoft of Redmond, Wash. By using these programs, a user can change the location of a file within a file management system or delete a file or perform other operations on the file using the capabilities of the file management system and the user interface for that file management system.

SUMMARY OF THE DESCRIPTION

Methods, machine readable tangible storage media, and data processing systems that can manipulate preview panels or windows are described.

In one embodiment, a preview panel can be transformed, in response to a user interaction with the preview panel, into an icon representing the file containing the content displayed in the preview panel. The preview panel can be user manipulatable and can be presented by a non-native application or service, and can be presented in response to a first input on a first icon. The preview panel, in one embodiment, can be transformed into a second icon in response to a second input, wherein the second icon is user manipulatable in the user interface and represents the same object that is represented by the first icon. In one embodiment, the second input can include a movement of the preview panel and a separate command during the movement, such as pressing the space bar on a keyboard or a gesture with a touch input device, etc. The first icon and the second icon can represent an object, such as a file, which was created by an application that is different than the non-native application or service which presents the preview. The non-native application or service can be a viewer application that does not include the ability to create or edit the file while a native application includes the ability to edit or create the file. Through a user interaction with the second icon, it is possible for the user to move the file from one location to another location in the file management system or to delete the file (e.g. by moving the second icon to a trash icon) or to create a duplicate of the file or to print a copy of the file or to send a copy of the file through an electronic network or perform other operations through manipulations of the second icon. In one embodiment, the first icon can be in a first location, such as a folder, in the file management system at the time of the first input and then the user can, by manipulating the second icon, move the file into a different location, such as a different folder or a trash receptacle, etc. by manipulating the second icon. In one embodiment, the first icon and the second icon can be displayed concurrently on a display device during the user's manipulation of the second icon. At the completion of a move of the second icon, in one embodiment, the first icon can be removed from the first location and placed, through an animation, in the second location indicated by the end of the move of the second icon; alternatively, the first icon can disappear from the location in the user interface provided to the user and appear only in the second location at the end of the move of the second icon. The locations can be represented by path names of objects in a directory in the file management system, in one embodiment of the present invention.

Another embodiment of the present invention relates to an aspect of modifying metadata for a file in a file management system based upon the manipulation of a preview panel which displays content of the file. In a method according to this embodiment, metadata for a file can be stored in a file management system, and this metadata can include a first storage location, such as a path name, of the file in the file management system. The method can further include displaying, in response to a first input, a preview panel which presents a content of the file, wherein the preview panel is user manipulatable (e.g. the panel can be moved on a desktop or closed to disappear from the desktop). The preview panel, in one embodiment, can be presented by a non-native application or service which is different than the application that is a native application that has the ability to create or edit the file. The method can further include receiving a second input which can be applied to the preview panel and which indicates a change to the file's location in the file management system. In one embodiment, this second input could be dragging of the preview panel or otherwise moving of the preview panel over the desktop in a user interface of the file management system. In response to this second input, the data processing system can change the metadata associated with the file; for example, the file management system may, in response to the second input, change the metadata to refer to a second location. Both the first location and the second location can refer to two different path names in the file management system. In one embodiment, the first location can be represented in part by a first folder in a graphical user interface for the file management system, and the second location can be represented in part by a second folder in the graphical user interface of the file management system. In one embodiment, the preview panel can be user manipulatable to allow at least one of a) scrolling through content of the file within the preview panel; b) paging through the content within the preview panel; c) zooming the content within the preview panel; d) playing a movie within the preview panel; and e) selecting one or more objects of the file from within the preview panel and causing the selected objects to be copied and pasted or dragged into another file, etc.

Another aspect of the present invention relates to the ability to create a standalone preview mode window or multiple preview mode windows which can exist concurrently and which can operate like other windows in that they can be obscured by an overlapping window which covers up a portion of or all of a preview panel while the content of the file is still presented within the partially obscured preview panel. A method according to this aspect can include displaying, in response to a first input, a preview panel which presents a content of a file, wherein the preview panel is user manipulatable and can be presented by a non-native application or service and is presented within a window of a first type of windows. The method can further include receiving a second input to present the content in a window of a second type that is different than the first type. In response to the second input, the window of the second type showing the content of the file is presented by the non-native application or service. The second input can be directed to the preview panel and cause the change between the first and second type. Windows of the first type can only have one instance, in one embodiment, displayed at any one point in time while one or more preview windows of the second type can be concurrently displayed at any one time. Further, the preview windows of the second type can be overlapped by other windows while they still retain the ability to present the content of each file that the window is providing a preview for. In one embodiment, preview windows of either the first type or the second type can be configured to allow the selection of a portion of or all of the text or other objects within the preview windows, and then allow a copying or dragging or moving operation, of the selection, to another file or document. For example, in one embodiment, a user can select text (or other object) from within a preview window and then can signal to the system (e.g. through a button or a gesture or cursor movement) that the selected text (or other object) is to be dropped into an existing file or window or a new file is to be created. In one example, a user can select text from within a preview window and then drag the text with a finger or stylus or cursor into another window or onto an icon representing an application (e.g. an email application) and this causes the system to paste the text into the another window or open a window controlled by the application (e.g. the email application) and deposit the text into that window.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 2A, 2B, 2C, 2D, 2E, 2F, and 2G show a sequence of user interfaces displayed over time as the user interacts with the system while manipulating a preview panel according to at least one embodiment of the present invention.

FIGS. 7A, 7B, 7C, 7D, and 7E show examples of a user interface in a sequence over time as a user manipulates and creates several standalone preview mode windows according to one embodiment of the present invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2010.

Figure 1A:
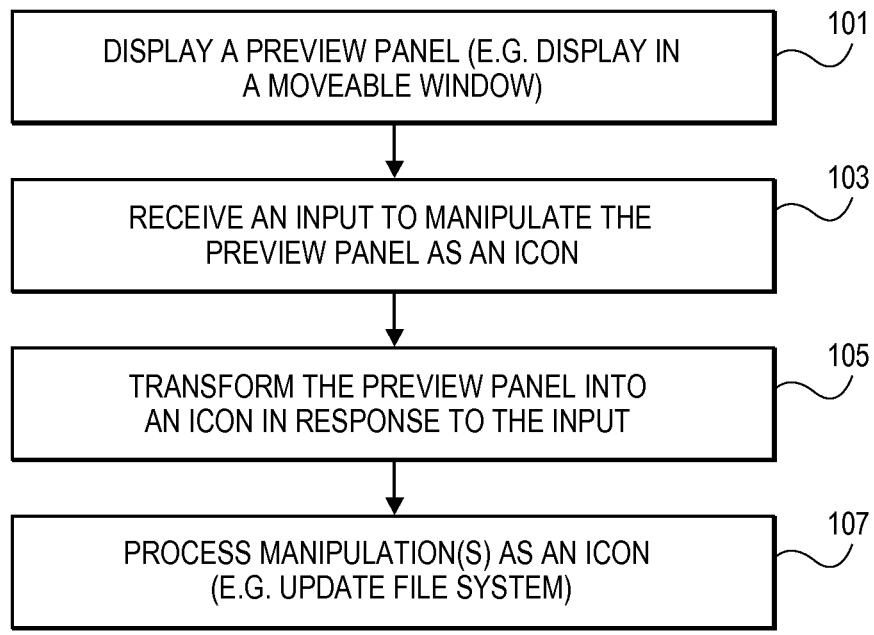
FIG. 1A is a flow chart showing a method according to one embodiment of the present invention.

A method according to one embodiment of the present invention is shown in FIG. 1A. This method can begin in operation 101 in which a preview panel can be displayed in, for example, a moveable window. In one embodiment, the window can be resizeable and closeable in addition to being removable. The window can be presented by a non-native application which is designed to provide previews of different types of files, such as word processing files (e.g. ".doc" files), PDF files, spreadsheet files, PowerPoint files, HTML files, movie files, etc. The non-native application, in one embodiment, cannot edit or create the files but can present the content of the files in a preview panel. In operation 103, the system can receive an input to manipulate the preview panel as an icon. In one embodiment, this input can be dragging or moving the preview panel while pressing a key, such as a space bar key on a keyboard. In another embodiment, the input can be dragging or moving the preview panel for a period of time greater than a predetermined period of time. In other embodiments, the input could be a touch screen gesture predetermined or configured to be interpreted as a request to manipulate the preview panel as an icon. In response to the input received in operation 103, the system can transform the preview panel into an icon in response to the input. Typically, the icon is considerably smaller than the preview panel and allows a larger portion of the desktop and other user interface elements to be viewable when compared to the size of the preview panel, which can obscure a considerable portion of a desktop or other display region on a display device. In one embodiment, the transformation from the preview panel into an icon can be animated. Once the preview panel has been transformed into an icon, it can be manipulated as an icon, such as an icon in the Finder in order to change parameters or metadata or other file properties of a file associated with the icon in the file management system. For example, the manipulation may involve moving the icon to a trash receptacle or moving the icon to a different folder than the original folder which contained the icon or to cause the document to be printed by dragging the icon onto a printer, or to cause the file to be sent over a network by dragging or otherwise moving the file over an indicator of a network or server, etc.

Figure 1B:
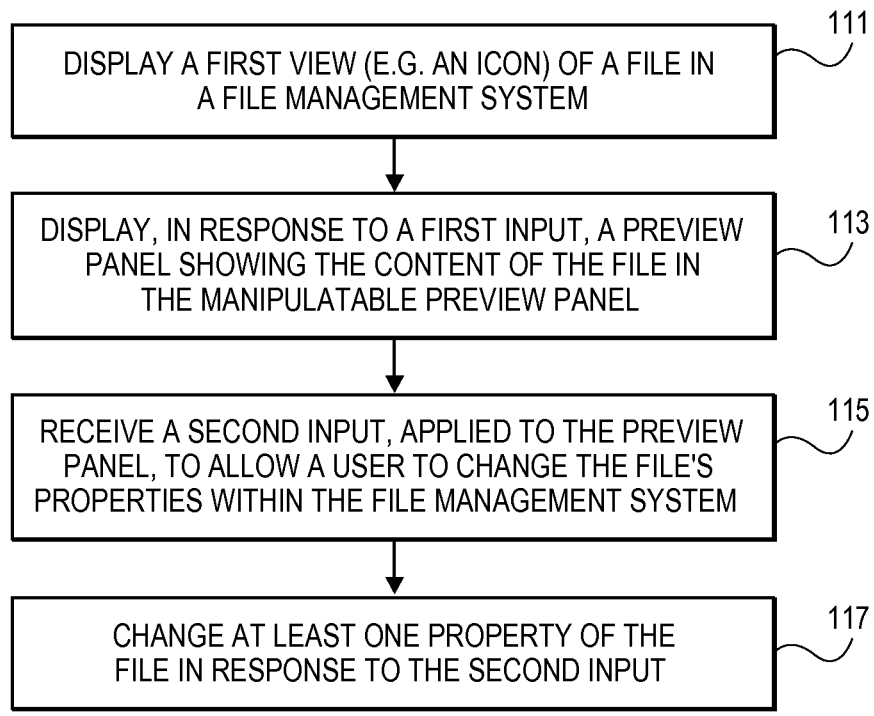
FIG. 1B is a flow chart of a method showing another embodiment of the present invention.

A method according to another embodiment is shown in FIG. 1B which can begin in operation 111; in operation 111, a first view of a file in a file management system can be displayed, and this first view can be a name of the file or an icon representing the file. A user can select the file in any one of a variety of ways known in the art and then select a preview command by pressing a key (e.g. pressing the space bar), or by selecting the preview command from a pop-up menu or by causing a gesture with the user's finger on a touch screen or touch input device or in other ways known in the art. These various inputs can be considered the first input and can cause the display of a preview panel in response to the first input. The preview panel can show the content of the file in a user manipulatable preview panel. For example, the user may manipulate the preview panel by moving the preview panel or by closing the preview panel. In one embodiment, the preview panel can be presented by a non-native application or service which is configured to present the content of a plurality of different types of files, such as word processing files, spreadsheet files, PowerPoint files, PDF files, HTML files, XML files, movie files, etc. In one embodiment, the non-native application cannot edit or create the file but can present the content of the file, while a native application can edit or create the file.

In operation 115, the system can receive a second input, which can be applied to the preview panel, to allow the user to change one or more of the file's properties within the file management system. For example, the user may change the location of the file within the system, delete the file, duplicate the file, etc. In response, the system, in operation 117, changes the at least one property of the file in response to the second input received in operation 115.

Figure 1C:
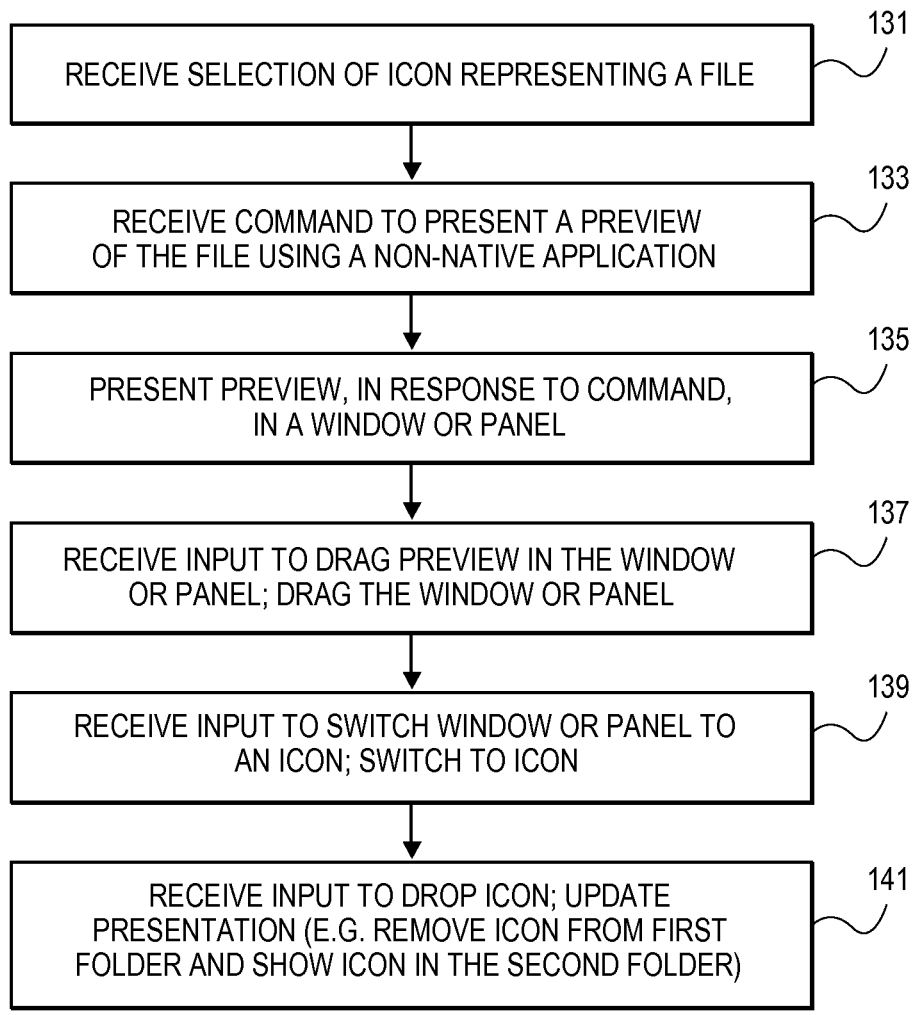
FIG. 1C is a flowchart illustrating another method according to another embodiment of the present invention.

The method shown in FIG. 1C is a more specific method for a particular embodiment of the present invention. In this embodiment, movement of the preview panel by, for example, dragging the preview panel with a cursor or the user's finger can only move the preview panel, and the system will require a further input to indicate the switch from the window or panel to an icon. The method of FIG. 1C can begin in operation 131 in which a system receives a selection of an icon which represents a file. In operation 133, the system receives a command to present a preview of the file using, for example, a non-native application. This command can be the result of a user input such as pressing a space bar or selecting a preview command from a pop-up window or a user gesture with a user's finger which is configured to cause the system to recognize the command, etc. In operation 135, the system presents the preview in response to the command received in operation 133. The preview can be presented in a window or a panel which is moveable by user input such as, for example, the use of a cursor or a user's finger applied to a portion of the window to indicate the movement. When the user moves the window, the system receives the input to drag or move the preview window in operation 137 and responds accordingly. For example, if the user moves the window to the right, the system will respond by moving the window to the right to follow the user's input. While the user continues to move the preview panel or window or momentarily stops the move, the user can also provide another input to indicate a switch from the preview panel to an icon. This is indicated in operation 139 in which the system receives this input and switches to an icon view. In one embodiment, this input to switch can be separate from a drag input or a move input. For example, this input to switch from the preview panel to an icon could be pressing a key on a keyboard or a user gesture with another finger while a first finger continues to move the preview panel, etc. In response to this input to switch, the system will transform the preview panel, with or without animation, into an icon which occupies substantially less space than the preview panel in many instances. Then in operation 141, the system can receive an input indicating that the icon has been dropped in a new location, and in response the system updates the presentation of the file management system by, for example, removing the icon from a first folder and showing the icon in a second folder.

FIGS. 2A, 2B, 2C, 2D, 2E, 2F, and 2G show a sequence of user interfaces shown on a display screen of a data processing system as a user causes a preview panel to appear and then manipulates the preview panel, causing it to transform into an icon and ultimately manipulates that icon to change the position of the file selected initially, effectively moving the icon from a first folder to a second folder in the example shown in these figures. Display screen 201 presents a user interface which includes desktop 205, menu bar 203, and windows 217 and 225 and a dock 211. In one embodiment, the user interface shown in FIG. 2A can be the user interface presented by the Macintosh operating system known as Mac OS X, and in particular the user interface presented can be the user interface available from the Finder program which is the user interface of a file management system in the Macintosh operating system. Windows 217 and 225 can each be windows controlled and presented by the Finder program, and each window is presenting a view into a folder which is a subdirectory in the file management system. In one embodiment, the user can interact with the system through a cursor which is controlled by a mouse or another cursor control device or through a touch screen through the user's finger or a plurality of fingers or through a stylus, etc. In the examples shown in FIGS. 2A-2G, a cursor 231 is shown as being used, but it will be appreciated that in alternative embodiments, the input device may be a touch screen which receives an input from one or more of the user's fingers as is known in the art. In those alternative embodiments, there may or may not be a cursor displayed on the display screen 201, depending on the implementation of the alternative embodiment. Desktop 205 also includes two icons: one is icon 207 which is for a storage device, such as a hard drive which can be the boot-up device of the data processing system; and icon 209, which is an icon representing a file which has been placed on the desktop. Also displayed on the lower portion of the desktop, is dock 211 which includes a plurality of icons, including icon 213 which is the icon to control the Finder application, and icon 215, which is an icon for the native application for at least one of the files in the system, such as the file represented by icon 233. The dot appearing below icon 213 indicates that the Finder program is executing while the absence of the dot under icon 215 indicates that the native application for one or more of the files in the file management system is not executing; the absence of this dot during the presentation of the preview indicates that the system is creating a preview of the content of a file without launching or opening the file in the native application. Menu bar 203 can include one or more pull-down menus, in one embodiment, including the menu for the program itself, in this case the Finder program as well as additional menu options for additional pull-down menus as is known in the art. Each of windows 217 and 225 include a side bar which can be identical in each of the windows; window 217 includes sidebar 219 and window 225 includes side bar 227. The side bar can include icons representing storage devices, folders, user folders, and is user configurable, in one embodiment, as is known in the art. Each of the windows also includes a display region to show the contents of each of the folders. In particular, window 217 includes a display region 221 and window 225 includes a display region 229. Display region 221 shows the contents of folder 1 while display region 229 shown shows the contents of folder 2. It can be seen from FIG. 2A that folder 2 appears to be empty while Folder 1 includes at least two files represented by icons 232 and 233.

At least certain embodiments of the present invention allow a user to obtain a preview of a file in order to decide whether or not the file should remain in a first folder or be moved to a second folder, and without having to close the preview panel, cause the move to occur by manipulating the preview panel directly rather than closing the preview panel and manipulating the original icon which was selected to generate the preview panel. Referring to FIG. 2B, it can be seen that the user has positioned the cursor 231 over the name or icon of the file associated with the icon 233 and has selected that file and has caused a preview to be generated showing the content of that file as preview content 243 within the preview panel 241. Preview panel 241 also includes a preview top bar 245 which a user may use to interact with the preview panel to move the preview panel. In addition, the preview panel 241 can include a close icon 246 which the user can select to close the preview panel and a resize control 247 which the user can use to resize the preview panel to show more or less of the content of the file in preview content 243. It will be appreciated that there may be numerous ways to activate a preview for a file, such as selecting the file and pressing a key on a keyboard or selecting the file and making a gesture with one or more fingers on a touch screen or selecting the file and then causing a pop-up menu to appear and selecting the preview option from the pop-up menu, etc. In each case, some mechanism has been used to select a file and then to cause the preview to appear as shown in FIG. 2B. The preview can be presented without requiring the native application to be launched, in one embodiment, as shown in FIG. 2B. In particular, in one embodiment, the file represented by icon 233 was created or edited by the application represented by icon 215 in dock 211. However, it can be seen that this application has not launched and the preview is presented because there is no dot under the icon 215 and because the Finder program name is still shown in menu bar 203.

After causing the preview panel 241 to appear as shown in FIG. 2B, the user has moved the cursor 231 over the preview top bar 245. At this point, the user can select the preview top bar by, for example, pressing a button on a keyboard or by pressing the mouse left or right button, etc. as is known in the art. The selection of the preview top bar can signal to the system that the user is about to move preview panel 241. In another embodiment, the user may place a finger or stylus on the preview top bar 245 to signal the selection of the preview top bar 245. In other embodiments, the user may select other regions of preview panel 241 such as within the panel over any portion of the preview content 243 in order to cause a selection of the panel which indicates the user intends to move preview panel 241. After the selection of preview top bar 245 or another portion of preview panel 241, the user can then move cursor 231 or move the user's finger or stylus to indicate movement of preview panel 241 which is reflected in the change of position of the preview panel between the user interface shown in FIG. 2C and the user interface shown in FIG. 2D. In particular, it can be seen that the user has moved the preview panel down and to the right towards folder 2. At some point during the move the user can, in one embodiment, indicate to the system an input to switch the preview panel to an icon. This input can be the same input as in operation 105 of FIG. 1A or the input described in operation 139 of FIG. 1C. The input can be pressing a button while preview panel 241 has been selected for a move operation or while it is being moved or, in another embodiment, the input can be a continued drag operation which continues for a period of time, such as a predetermined period of time, which indicates to the system the user has requested that the preview panel be transformed into an icon. In other embodiments, this input could be a finger gesture on a touch screen, such as a second finger being swiped over the content or preview panel 241 while a first finger maintains a selection of a portion of the preview panel, such as the preview top bar 245. In response to this input, the system transforms the preview panel into an icon representing the same file as icon 233. FIG. 2E shows an example of this transformation in which the preview panel 241 has been transformed into icon 241A and cursor 231 is shown positioned over icon 241A as the user continues to move what has now transformed into an icon toward folder 2. In one embodiment, an optional indicator or other indicia can appear relative to icon 233 or the name for that file as shown in FIG. 2E to indicate that that file has been selected for a manipulation. It will also be appreciated that the file is represented by two separate icons, icon 233 and icon 241A at the same time and displayed at the same time in the embodiment shown in FIG. 2E. It will also be appreciated that one icon may be displayed differently than the other. For example, icon 233 could become darkened or could flash while icon 241A could appear as icon 233 in FIG. 2A prior to the selection of that icon. In one embodiment, if the user returns icon 241A to the original folder (folder 1) shown within window 217, then icon 241A can resort to the preview panel 241.

Referring now to FIG. 2F, it can be seen that the user has moved icon 241A into display region 229 of window 225. Optional indicator 233A still indicates that the file represented by icon 233 is being manipulated in the file management system as described above.

Referring now to FIG. 2G, it can be seen that the user has ended the move by, for example, releasing a mouse's button during a drag operation which began in FIG. 2C and ended in FIG. 2G, or by providing another input to the system indicating the end of the move. Icon 233 now resides within display region 229 of window 225 and no longer exists within display region 221 of window 217. In one embodiment, an optional animation which shows icon 233 moving from display region 221 to display region 229 can occur. It can be seen from the example provided in FIGS. 2A-2G that the user has changed the position of a file within the file management system through the direct manipulation of the preview panel which has been transformed during that manipulation into an icon. It will be appreciated that a change of file locations within a file management system is one property that can be changed, and that other properties could be changed; for example, the file could be deleted by dragging the preview panel toward a trash receptacle or to a printer icon or to a network icon or a server icon. In the case of a drag or move towards a trash receptacle, the file can be deleted. In the case of a drag or move toward a printer icon, the file can be printed. In the case of a drag or move to a network icon or a server icon, a copy of the file can be transmitted over a network or stored onto a remote storage device.

In an alternative embodiment, the transformation of the preview panel into an icon can occur at the end of the move or drag rather than in the middle of the move or drag. This is described further below in conjunction with FIG. 4.

Figure 3:
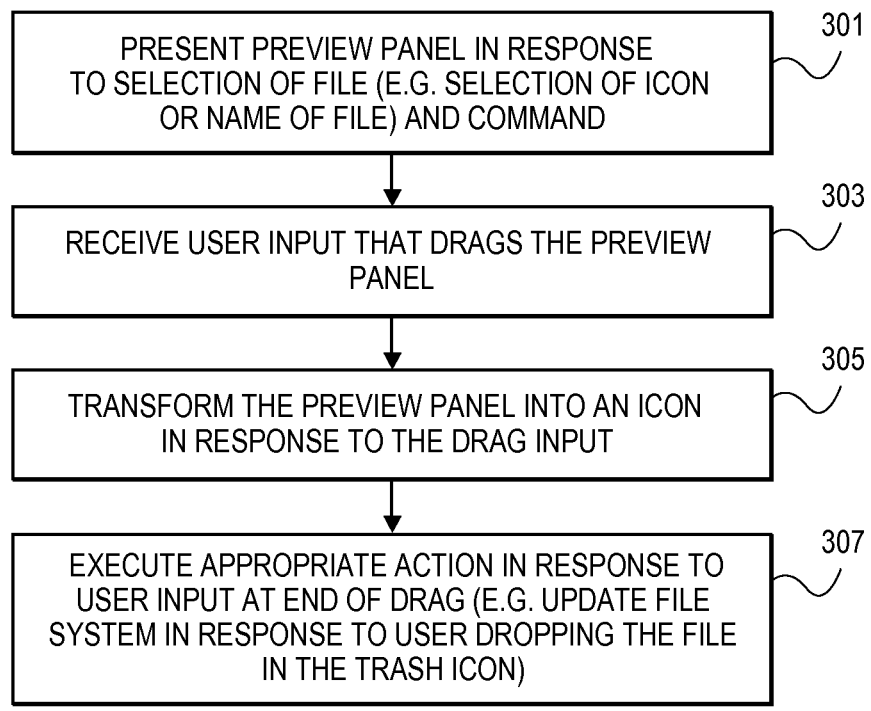
FIG. 3 is a flow chart which illustrates a method according to another embodiment of the present invention.

A method according to another embodiment of the present invention is shown in FIG. 3. In this method, which can begin in operation 301, moving or dragging of the preview panel by itself without any further input can cause the transformation of a preview panel into an icon. In other words, no extra command or second input is required, such as pressing a key on a keyboard or a user's gesture with a second finger on a touch screen, etc. In this embodiment, the movement or dragging of the preview panel may be measured against a predetermined threshold in time or distance for the move or drag. For example, a short move or drag in time or distance can be interpreted to not require the transformation while a longer move or drag in time or distance could be interpreted as a request to transform the preview panel into an icon. In operation 301, a preview panel is presented in response to a selection of a file and a command as described previously. Then in operation 303, the system can receive a user input that drags or otherwise moves the preview panel. Then, in response to the dragging, the system transforms the preview panel in operation 305 into an icon. As noted above, the transformation can occur as soon as the drag begins without any further input or after a period of time of moving or dragging the preview panel, where the time can be a predetermined period of time which is used to interpret the user's desire to cause the transformation, in one embodiment. In operation 307, the system executes the appropriate action in response to the user input at the end of the drag or move of the icon created in operation 305. For example, the system could update a file management system to indicate the user has moved the file from one folder to another folder or has moved the file to a trash receptacle to delete the file, etc.

Figure 4:
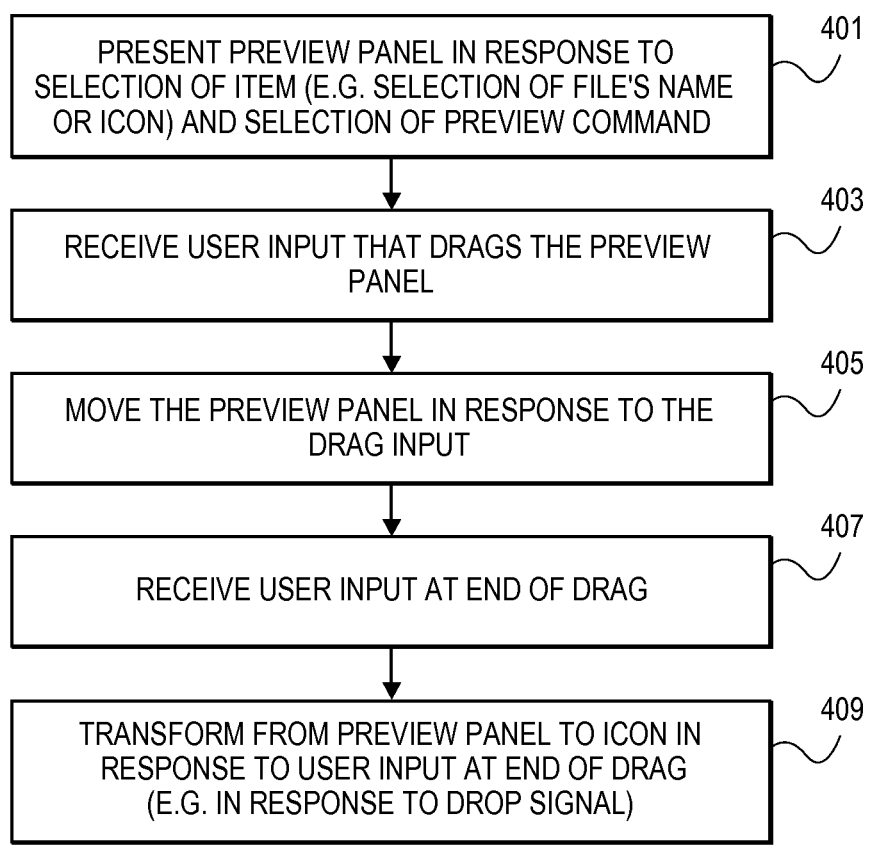
FIG. 4 is a flow chart which shows a method according to another embodiment of the present invention.

The method shown in the flow chart of FIG. 4 is an example of an embodiment in which the preview panel is not transformed into an icon until the end of the move or drag by the user. The system interprets the end of the move or drag based upon an input from the user, such as releasing of a mouse's button or pressing of a key or a gesture with a second finger of the user, etc. The method shown in FIG. 4 can begin in operation 401 in which the preview panel is presented on a display device in response to a selection of an item, such as the selection of a file's name or icon and in response to a selection of the preview command as described herein. In operation 403, the system receives a user input that indicates a move or drag of the preview panel and, in response, the system in operation 405 moves the preview panel on a display in response to the move or drag input. At the end of the drag or move, the user will provide a further input, such as the release of a mouse's button or the press of a key on a keyboard or a gesture with a second finger of the user while the first finger is controlling the move of the preview panel, etc. This second input received in operation 407 will result in operation 409 in which the preview panel will transform to an icon in response to the input received in operation 407. In one embodiment of the method of FIG. 4, the preview panel may be reduced in size while being moved in order to permit a view of the surrounding windows or desktop region, although the preview panel in this implementation can still be larger than a standard icon on the data processing system.

Figure 5:
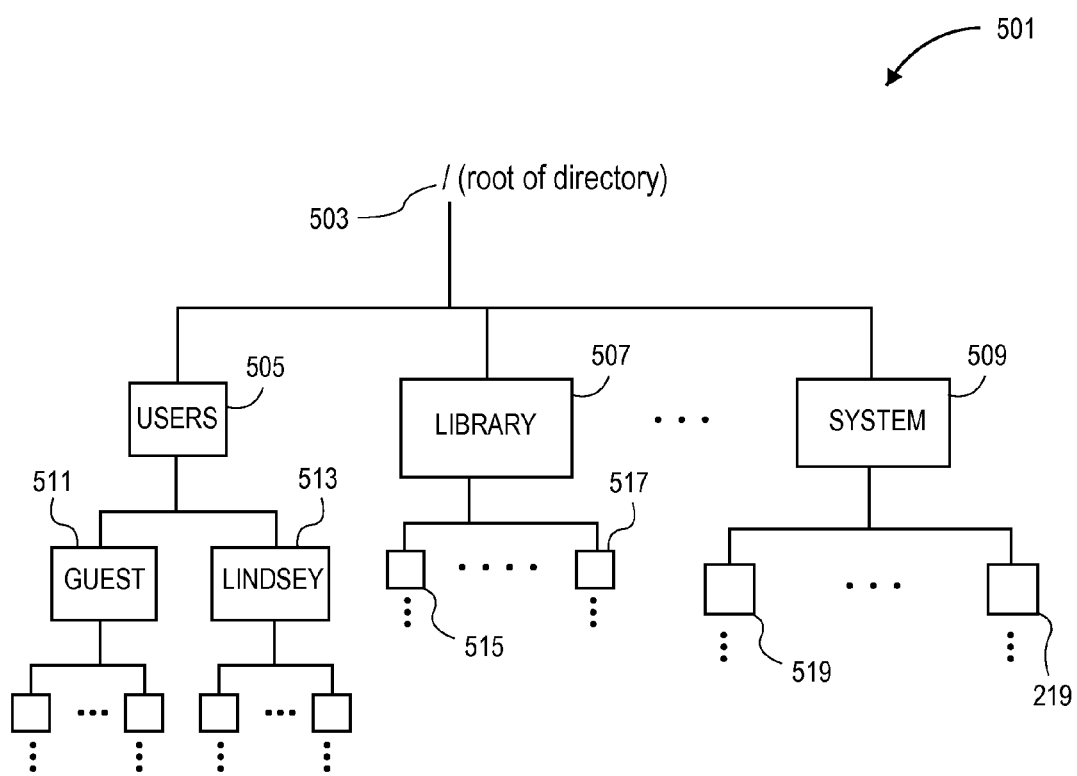
FIG. 5 shows a graph depicting a tree structure representing file path names in a directory of a file management system.

FIG. 5 shows an example of a directory structure in a file management system. This directory structure is hierarchical in that there is a root directory at the top of the structure and folders or subdirectories below that which contain other folders or subdirectories. The structure 501 includes the root 503 as well as subfolders 505, 507, and 509, each of which contain other folders or subdirectories as shown in FIG. 5. It will be understood that when a user moves or drags the preview panel to change the location of the file, the location of the file and path name will change in one embodiment such that, for example, the user moves a file from within the subdirectory 511 to the subdirectory 513, etc.

Figure 6:
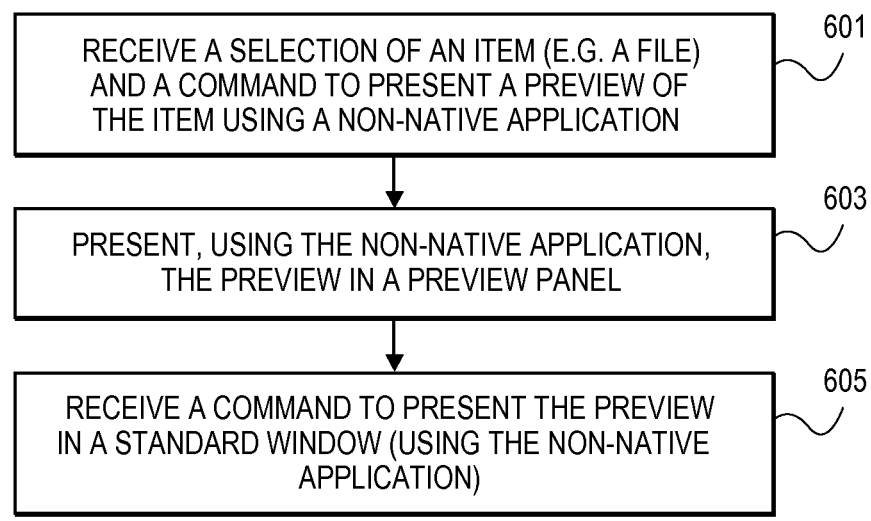
FIG. 6 is a flow chart showing a method according to another embodiment of the present invention.

FIG. 6 shows an example of another method according to an embodiment of the present invention in which a preview is displayed in a preview panel which is a first type of window, initially, and then it can be transformed into a second type of window which has different capabilities relative to the first type of window. In other words, a user, in this embodiment, can transform a preview panel from a first type of window to a second type of window, where the types of windows are different and behave differently. This method is also shown in the user interfaces shown in FIGS. 7A, 7B, 7C, 7D, and 7E. The method shown in FIG. 6 can begin in operation 601 in which a data processing system receives a selection of an item, such as a file, and a command to present a preview of the item using, for example, a non-native application which cannot create or edit the file. In response to the command to present a preview, the system, in operation 603, presents, using the non-native application, the preview in a preview panel. An example of a preview panel is preview panel 725 shown in FIG. 7A which is presented above two windows 721 and 723 shown in FIG. 7A. The content of the file or item selected in operation 601 appears within the preview panel, such as preview panel 725, and this content is presented through, in one embodiment, the non-native application which is configured to present content from a plurality of different file types without being able to create or edit the files, while native applications for those file types can create or edit or both create and edit the content of those files.

Figure 7E:
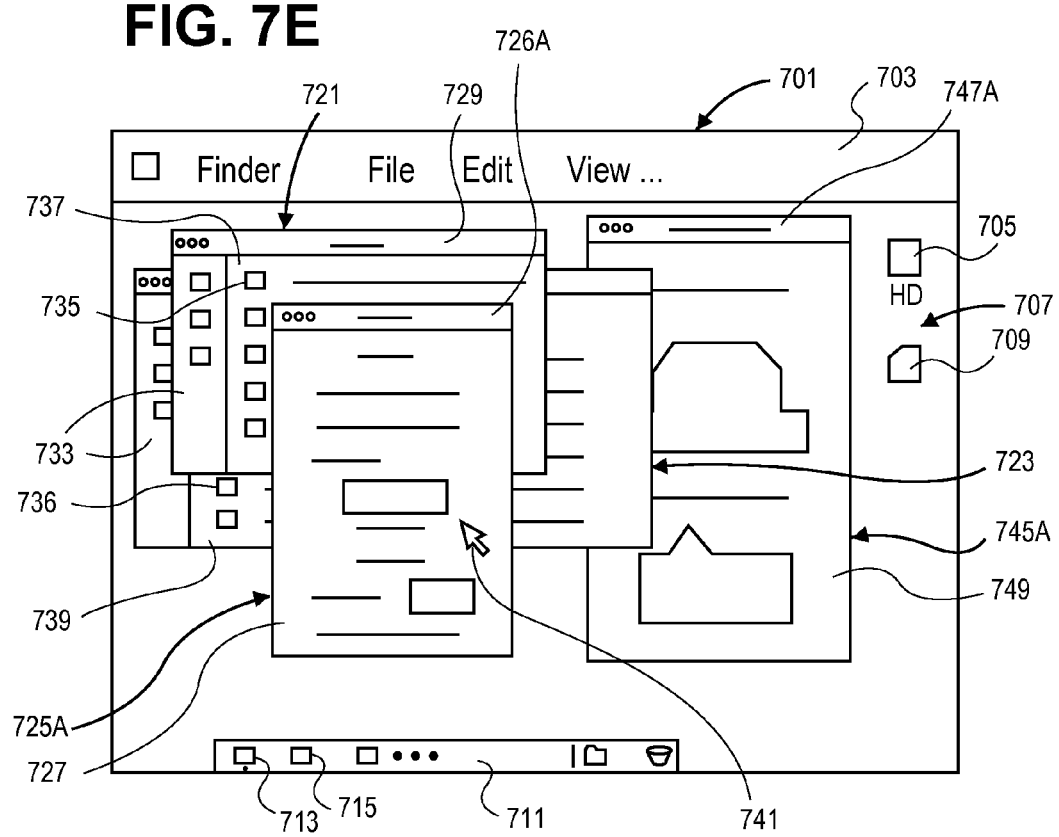

In prior art systems, the preview panel, which is a first type of window, had limited capabilities. For example, it could not be minimized, no printing is possible, no copying and pasting is possible, and you cannot have more than one preview panel open at any point in time, and it must be the most front-most/foreground window to show the content of the file. Any attempt to obscure the preview window behind another window will result in the content not appearing in the preview panel. Furthermore, a user could not show two different files both in the preview mode at the same time. The embodiment of FIG. 6 permits a user to use the non-native application to present previews of two or more files concurrently, and allows those windows used for the previews, in the second type of windows, to be overlapped as can be seen in FIGS. 7C, 7D, and 7E and as will be explained further below. In operation 605, the system receives a command to present the preview in a standard window which is a second type of window using the non-native application to present content in the standard window; in another embodiment, the second type of window may be different than a standard window but still have greater capabilities than the first type of window. In one embodiment, the second type of window to present previews can have the capabilities of windows for the file management system, such as the Finder in one embodiment. As shown in FIGS. 7C, 7D, and 7E, the second type of window which presents the preview can be partially obscured by other windows and still present the content of the preview and can be minimized or maximized or closed. The system, in response to the command in operation 605, can present one or more previews of the content of files concurrently in windows of the second type. The command may be entered in any one of a plurality of ways including, for example, selecting a command from a pull-down menu or selecting a command from a pop-up menu or a multi-finger gesture applied to the preview panel displayed within the window of a first type, etc.

Referring now to FIG. 7A, a display screen 701 displays a user interface for the Finder program from Apple Inc. of Cupertino, Calif. The user interface includes a menu bar 703 which is known in the art to include one or more menu options which can be used to present pull-down menus from menu bar 703. Desktop 707 is displayed with an icon 705 for a storage device and icon 709 for a file shown on the desktop. Dock 711 is shown at the periphery of a desktop and includes icon 713 for the Finder program and icon 715 for a native application which does not need to be launched in order to see the content of a file created by that native application using the non-native application in a preview mode. Finder windows 721 and 723 each include a side bar region 733 and a display region 737 and 739 within their respective windows. In the example shown in FIG. 7A, a user has selected a file, such as the file represented by icon 735, and caused the presentation of a preview of the content of the file through the use of a non-native application which presents the content 729 within preview panel 725 for the file represented by icon 735. Window 721 can show the content of a folder within a file management system, and similarly window 723 can show the content of files within a folder in the file management system. The user can select a file from either window or other windows or an icon on the desktop. The selection may be performed using cursor 741 which can be controlled by a mouse or other cursor control device or though the use of keys on a keyboard or through the use of a touch screen or other touch input devices. Preview panel 725 can include a preview top bar 726 which includes a close icon on the left side of the preview top bar. It can be seen that the preview top bar 726 includes a single control for closing the preview panel while other windows, such as window 721 include in their title bars, such as title bar 729 of window 721, a title for the window as well as three window controls for closing, minimizing, and maximizing the window.

In one embodiment, a user can select the preview panel 725 and change its window type through a command, as in operation 605 of FIG. 6. In one embodiment, the command may involve positioning cursor 741 within preview panel 725 and pressing a mouse's right button to bring up a pop-up menu from which the user can select the command; in another embodiment, a gesture with one or more fingers of the user which are predetermined to indicate the command can be used. In another embodiment, the command could be selected from a pull-down menu from menu bar 703, etc. In response to the command, the appearance of the window can change as shown in FIG. 7B while still displaying preview content 727. In the case shown in FIG. 7B, the title bar has transformed to title bar 726A which includes three icons for controlling the window now containing preview content 727 and also includes the file's title in title bar 726A. The three window control icons in title bar 726A can include a close icon, a minimize icon, and a maximize icon. Preview panel 725A is an example of the second type of window while preview panel 725 is an example of the first type of window. In one embodiment, preview panel 725 cannot be placed behind other windows, such as window 721 or window 723 and be able to display preview content 727 when behind other windows. Furthermore, preview panel 725, in one embodiment, cannot be minimized and cannot receive a user selection of content within the preview panel in order to perform a copy operation. On the other hand, preview panel 725A can be partially obscured by other windows which overlap it as shown in FIGS. 7C and 7D while still being able to show the content of the file as preview content 727.

As shown in FIG. 7C, a user can select another window to now appear on top of preview panel 725A. In this embodiment, the user has selected, through the use of cursor 741, the file associated with icon 736 which is contained within window 723. The user can then select a command to present a preview, using the non-native application of the content of the file represented by icon 736, and this results in the display of preview panel 745 shown in FIG. 7D. Preview panel 745 includes preview top bar 747, and the preview content 749 is displayed within preview panel 745. Preview content 749 shows the content of the file represented by icon 736 which was selected from the user interface shown in FIG. 7C. The user can now switch preview panel 745 from a first type of window to a second type of window through another command which has been described relative to operation 605 in FIG. 6, and this can cause the presentation of preview panel 745A shown in FIG. 7E which presents the content of the file using a non-native application, in one embodiment, within preview panel 745A which is the second type of window relative to the preview panel 745. The user can then perform further manipulations, bringing other windows front most, such as window 721 or window 723 in order to change the order of the display of windows in the manner shown in FIG. 7E. Through all of these changes, the two preview panels 725A and 745A can continue to be displayed concurrently along with the other windows and can continue to present the content of the files being previewed within the respective preview panels through the use of the non-native application described herein. In this manner, it is possible for a user to not have to launch the native application, which may not be present on the user's system, in order to view multiple previews of one or more file types concurrently on the display system of the data processing system.

It will be appreciated that one or more of the embodiments described herein may be implemented on other operating systems, such as Windows operating systems, Unix operating systems, Linux operating systems, etc. employing the various user interfaces of those operating systems with the embodiments described herein. For example, preview panels may be manipulatable to transform into icons in the Windows or other operating systems or preview panels may be switchable between window types as described herein in the Windows or other operating systems. It will also be appreciated that the various embodiments of preview panels or preview windows can include the ability to allow the selection of a portion of or all of the text (or other objects) within the preview panels or windows and then allow a copying or dragging or moving operation, of the selection, to another file or document. For example, in one embodiment, a user can select text (or other object) from within a preview window and then can signal to the system (e.g. through a button or a gesture or a cursor movement) that the selected text (or other object) is to be dropped into an existing file or window or a new file is to be created with the selected content (e.g. selected text or other objects).

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 8:
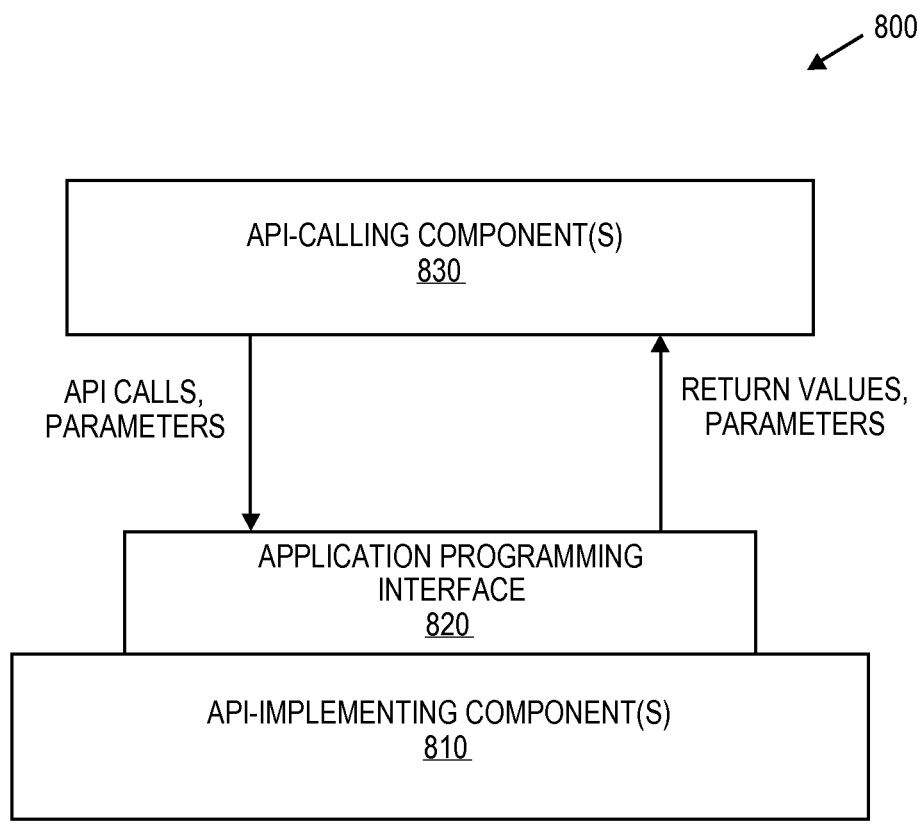
FIG. 8 illustrates a block diagram of an exemplary API architecture useable in some embodiments of the present invention.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 9:
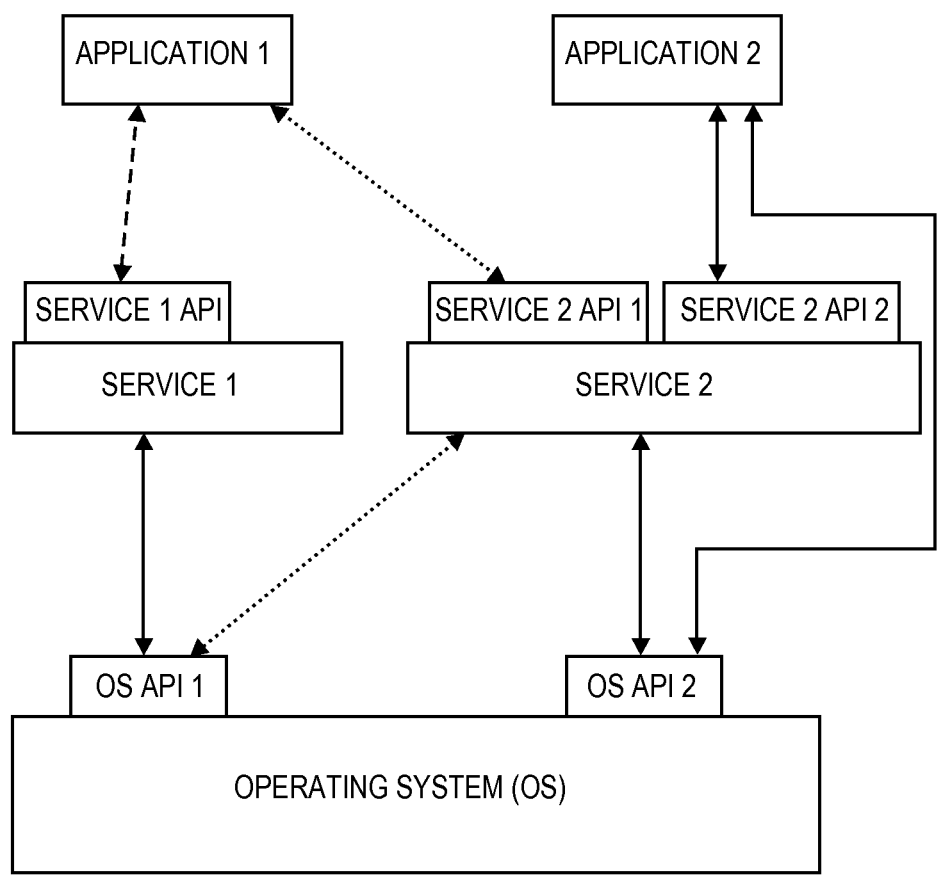
FIG. 9 shows an exemplary embodiment of a software stack useable in some embodiments of the present invention.

In FIG. 9 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 10:
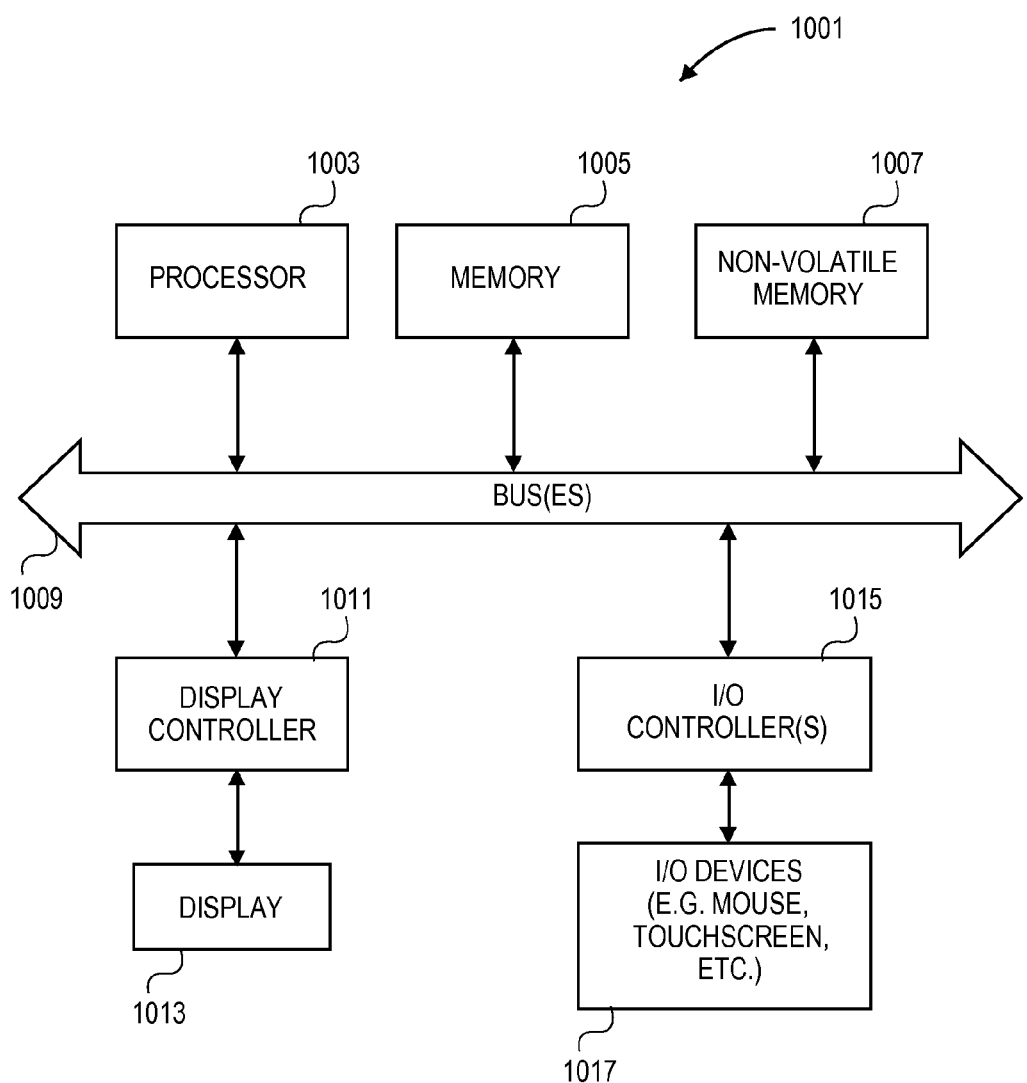
FIG. 10 shows, in block diagram form, an example of a data processing system which can be used with one or more of the embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 10 shows one example of a typical data processing system which may be used with the present invention. Note that while FIG. 10 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 10 may also be used with the present invention. The data processing system of FIG. 10 may be a Macintosh computer from Apple Inc. of Cupertino, Calif. As shown in FIG. 10, the data processing system 1001 includes one or more buses 1009 which serve to interconnect the various components of the system. One or more processors 1003 are coupled to the one or more buses 1009 as is known in the art. Memory 1005 may be DRAM or non-volatile RAM or may be flash memory or other types of memory. This memory is coupled to the one or more buses 1009 using techniques known in the art. The data processing system 1001 can also include non-volatile memory 1007 which may be a hard disk drive or a flash memory or a magnetic optical drive or magnetic memory or an optical drive or other types of memory systems which maintain data even after power is removed from the system. The non-volatile memory 1007 and the memory 1005 are both coupled to the one or more buses 1009 using known interfaces and connection techniques. A display controller 1011 is coupled to the one or more buses 1009 in order to receive display data to be displayed on a display device 1013 which can display any one of the user interface features or embodiments described herein. The display device 1013 can include an integrated touch input to provide a touch screen. The data processing system 1001 can also include one or more input/output (I/O) controllers 1015 which provide interfaces for one or more I/O devices, such as one or more mice, touch screens, touch pads, joysticks, and other input devices including those known in the art and output devices (e.g. speakers). The input/output devices 1017 are coupled through one or more I/O controllers 1015 as is known in the art. While FIG. 10 shows that the non-volatile memory 1007 and the memory 1005 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 1009 may include one or more bridges or controllers or adapters to interconnect between various buses. In one embodiment, the I/O controller 1015 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a memory, such as the memory 1005 or the non-volatile memory 1007 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable, non-transitory, tangible storage medium storing executable instructions that when executed cause a data processing system to perform a method comprising:
   presenting, in response to a first input on a first icon, a preview panel which presents a content of an object represented by the first icon, wherein the preview panel is user manipulatable and is presented by a non-native application or service;
   receiving a second input which is applied to the preview panel;
   saving the contents of the preview panel into a second icon in response to the second input, the second icon being user manipulatable in a user interface and representing the object.

2. The medium as in claim 1 wherein the second input includes a movement of the preview panel and a separate command during the movement and wherein the object was created by an application that is different than the non-native application or service, and wherein the non-native application or service is a viewer application that does not include the capability to create or edit the object.

3. The medium as in claim 1 wherein the object is a file and wherein the second icon is user manipulatable to allow, through an interaction with the second icon, at least one of: (a) moving the file from one location to another location; (b) creating a duplicate of the file; (c) printing a copy of the file; (d) sending a copy of the file through an electronic network; and (e) deleting the file by moving the file to a trash icon.

4. The medium as in claim 3 wherein the first icon is in a first location in a representation of a file management system at a time of the first input and the method further comprises:
   receiving an input indicating that the second icon has been moved to a second location in the representation of the file management system, and in response to the input indicating that the second icon has been moved, removing the first icon from the first location.

5. The medium as in claim 4 wherein the first location is a first folder and the second location is one of a second folder or a trash container.

6. The medium as in claim 5 wherein a directory pathname of the file is changed to refer to the second location.

7. The medium as in claim 6 wherein the preview panel is moveable and resizable, and wherein the first icon and the second icon are representing the object and are concurrently displayed.

8. A machine readable, non-transitory, tangible storage medium storing executable instructions that when executed cause a data processing system to perform a method comprising:
   storing metadata for a file stored in a file management system, the metadata including a first location of the file in the file management system;
   displaying, in response to a first input, a preview panel which presents a content of the file, wherein the preview panel is user manipulatable and is presented by a non-native application or service;
   receiving a second input, the second input being applied to the preview panel and indicating a change to the file's location in the file management system;
   changing the metadata to refer to a second location in response to the second input.

9. The medium as in claim 8, wherein the first location is specified by a first pathname and the second location is specified by a second pathname that is different than the first pathname.

10. The medium as in claim 9, wherein the first location is represented in part by a first folder in a graphical user interface for the file management system and the second location is represented in part by a second folder in the graphical user interface.

11. The medium as in claim 8 wherein the non-native application or service is a viewer application that does not include the ability to create or edit the file.

12. The medium as in claim 11 wherein the preview panel is user manipulatable to allow at least one of:
   (a) scrolling through content of the file within the preview panel; (b) paging through the content within the preview panel; (c) zooming the content within the preview panel; and (d) playing a movie within the preview panel; and wherein the second input includes a movement of the preview panel in a user interface with at least one of a cursor or a touch input.

13. A machine implemented method comprising:
   storing metadata for a file stored in a file management system, the metadata including a first location of the file in the file management system;
   displaying, in response to a first input, a preview panel which presents a content of the file, wherein the preview panel is user manipulatable and is presented by a non-native application or service;
   receiving a second input, the second input being applied to the preview panel and indicating a change to the file's location in the file management system;
   changing the metadata to refer to a second location in response to the second input.

14. The method as in claim 13, wherein the first location is specified by a first pathname and the second location is specified by a second pathname that is different than the first pathname.

15. The method as in claim 14, wherein the first location is represented in part by a first folder in a graphical user interface for the file management system and the second location is represented in part by a second folder in the graphical user interface.

16. The method as in claim 13 wherein the non-native application or service is a viewer application that does not include the ability to create or edit the file.

17. The method as in claim 16 wherein the preview panel is user manipulatable to allow at least one of:
   (a) scrolling through content of the file within the preview panel; (b) paging through the content within the preview panel; (c) zooming the content within the preview panel; and (d) playing a movie within the preview panel; and wherein the second input includes a movement of the preview panel in a user interface with at least one of a cursor or a touch input.

18. A machine readable, non-transitory, tangible storage medium storing executable instructions that when executed cause a data processing system to perform a method comprising:
- displaying, in response to a first input, a preview panel which presents a content of a file, wherein the preview panel is user manipulatable and is presented by a non-native application or service and is presented within a window of a first type;
- receiving a second input to present the content in a window of a second type that is different than the first type, wherein the window of the second type has more functionality available than the window of the first type;
- displaying the window of the second type in response to the second input, the content being presented in the window of the second type by the non-native application or service.

19. The medium as in claim 18 wherein the second input is directed to the preview panel and wherein multiple instances of windows of the second type can be concurrently displayed while only one instance of a window of the first type can be displayed at any one time.

20. The medium as in claim 18 wherein the second input is directed to the preview panel and wherein a window of the second type is displayable while obscured partially by other windows, and wherein a window of the first type is available only when a front most window.

21. The medium as in claim 19 wherein the non-native application cannot create or edit the file which can be edited or created by a native application.

* * * * *